No. 871,110.
PATENTED NOV. 19, 1907.
W. R. COMINGS.
MECHANICAL MOVEMENT.
APPLICATION FILED JUNE 14, 1906.
2 SHEETS—SHEET 2.
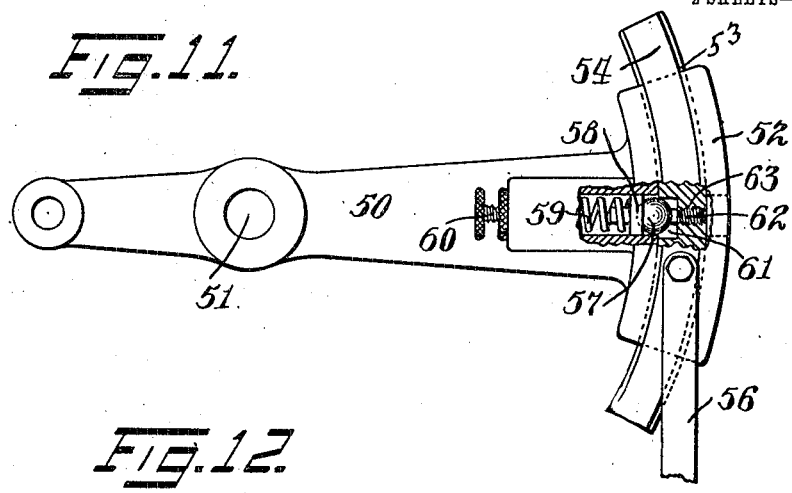
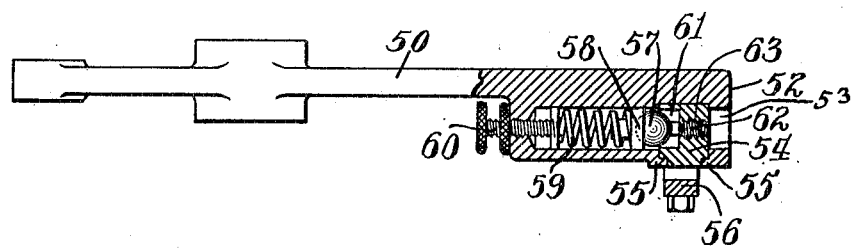
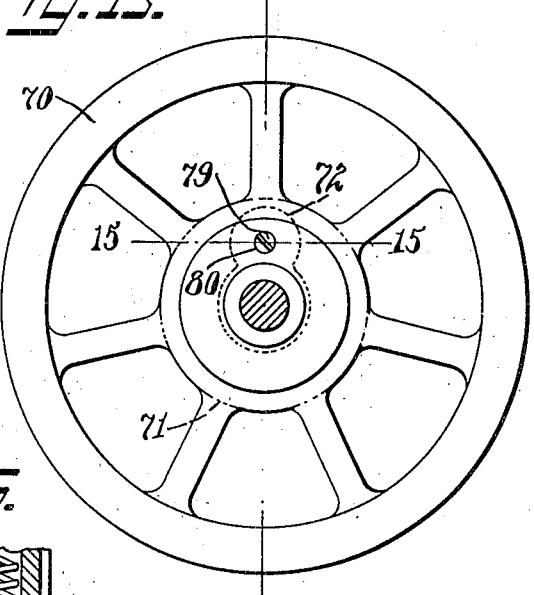
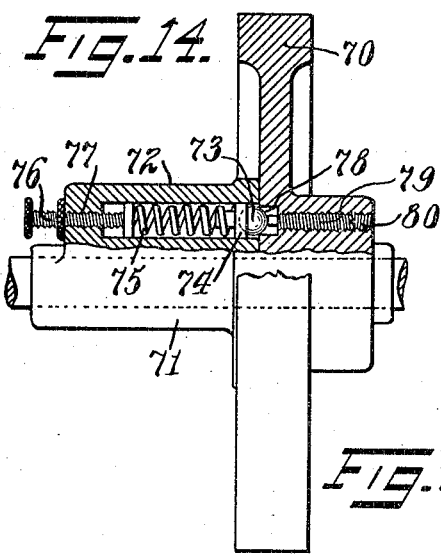
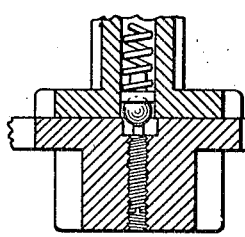
Witnesses:
Inventor:
William R. Comings,
By his Attorney;

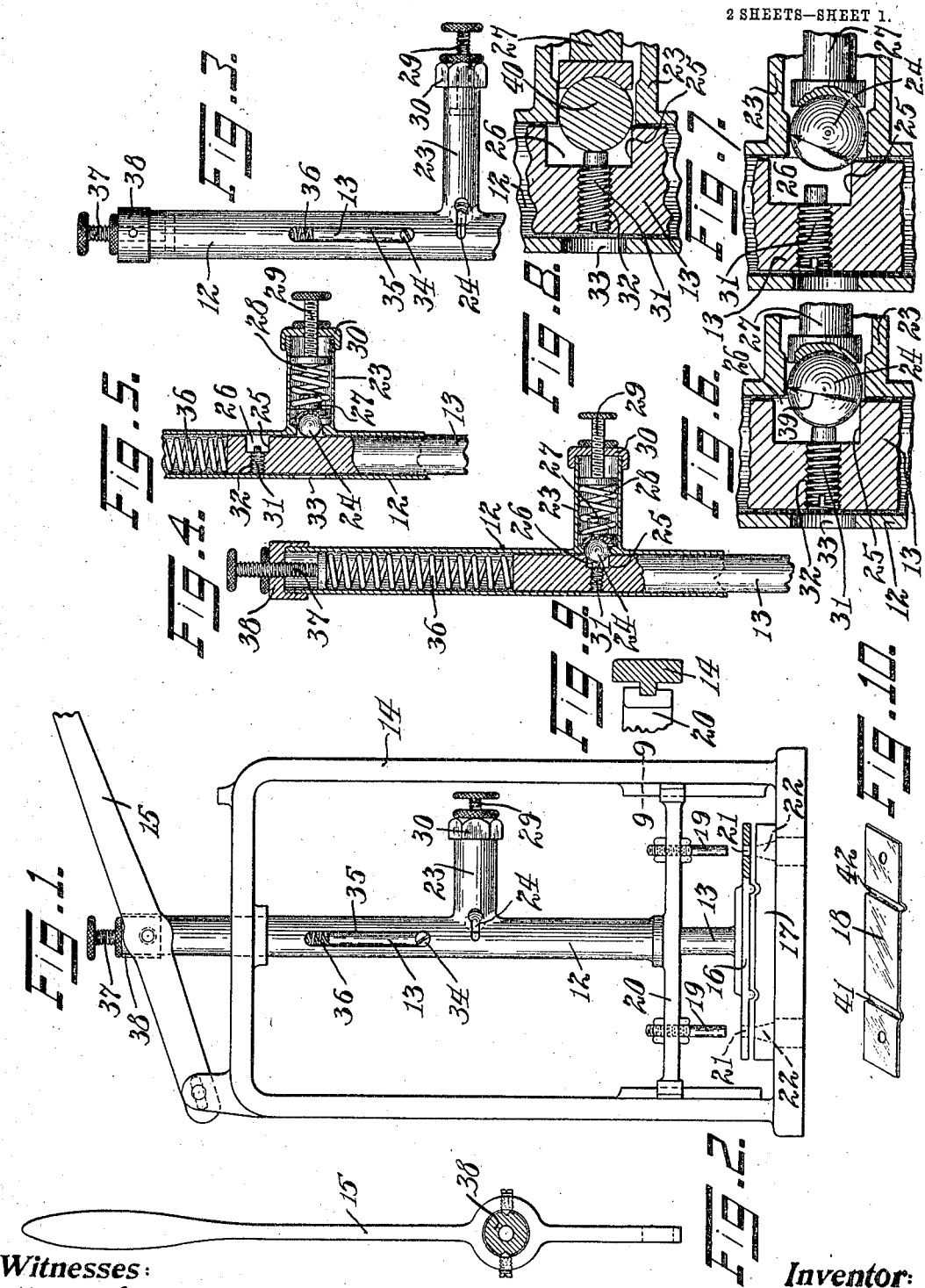

UNITED STATES PATENT OFFICE.

WILLIAM R. COMINGS, OF LONDON, ENGLAND

MECHANICAL MOVEMENT.

No. 871,110.  Specification of Letters Patent.  Patented Nov. 19, 1907.

Application filed June 14, 1906. Serial No. 321,601.

*To all whom it may concern:*

Be it known that I, WILLIAM R. COMINGS, a citizen of the United States of America, residing in Wharncliffe Wimbledon, London, S. W., England, have invented certain new and useful Improvements in Mechanical Movement, of which the following is a specification.

This invention relates to a form of mechanical movement for the locking or interlocking of two members of a machine or device that are movable relatively, until the application of a certain predetermined amount of force, whereupon the locking means will automatically release, and permit the relative sliding movement of the members.

One object of the invention is to provide means whereby two members will be locked together until the exertion of a certain predetermined force, tending to cause the members to move relatively, whereupon the locking means will yield and permit the relative movement of the members.

A further object is to provide means for varying the resistance of the locking means whereby the amount of force necessary to cause the locking member to yield, can be regulated as desired.

A further object is to provide a form of rolling locking member whose working position can be adjusted whereby the angle of engagement with the movable member can be varied, and thereby the amount of force necessary to unlock the members can be regulated.

In the accompanying drawings illustrating embodiments of my invention, Figure 1 shows a conventional form of press, showing forming and cutting dies, with my invention applied thereto. Fig. 2 is a view of the lever for operating the press, showing its connection with the plunger member. Fig. 3 is a fragmentary view in elevation of certain parts shown in Fig. 1. Fig. 4 is a vertical axial section through the plunger member and other parts, showing it in normal position. Fig. 5 is a view similar to Fig. 4 showing the sliding members in advance position. Fig. 6 is an enlarged fragmentary view corresponding to Fig. 4. Fig. 7 is a view similar to Fig. 6 but with the slidable rod in a slightly advanced position. Fig. 8 is a view similar to Fig. 6 of a modification showing a roller instead of a ball locking member.
Fig. 9 is a section on the line 9—9 indicated in Fig. 1. Fig. 10 represents a piece of work operated upon by one of the parts shown in Fig. 1. Fig. 11 shows in side elevation, partly in section, a modification in which the two members provided with the interlocking means, are movable in a curved path. Fig. 12 is a plan view, partly in section of the construction shown in Fig. 11. Fig. 13 illustrates another modification of members moving in curved paths, in which the interlocking means is placed between side faces, instead of on the peripheries of the members as shown in Fig. 11. Fig. 14 is a side elevation partly in section, of the parts shown in Fig. 13; and Fig. 15 is a partial section on the line 15—15 indicated in Fig. 14.

The invention comprises essentially two members which are relatively movable, and a locking means arranged to retain the members in a certain relative fixed position, until the exertion of a certain predetermined force, which will cause the locking means to yield and permit the relative sliding movement of the members. In one construction illustrated, one of the members comprises a plunger tube 12, in which a member is slidable, the other member, in the form shown comprising a plunger rod 13. In the application of the mechanical movement illustrated in Fig. 1, the plunger tube 12 is slidable in a frame 14, and operated by a lever 15 hinged at the top of the frame. The plunger rod 13 is shown as carrying a pressing die member 16 coöperating with a stationery die plate 17, to suitably impress a piece of work, such as a strip 18, placed between the die members. Upon the lever being depressed, the plunger members 13 and 12 being locked together, the pressing dies 16 and 17 will engage and arrest the movement of the tube 12 and lever. But upon sufficient pressure being exerted, since the rod 13 has its further movement prevented, the locking means will yield, and permit the further movement of the plunger tube 12. This tube 12 may carry a second working member that will be brought into operation subsequent to the operation of the working member carried by the plunger rod 13. In the form shown, cutting dies 19 are secured to a bar 20 fast on the plunger tube 12, and pass through apertures 21 in the die plate 16; and after piercing the work or plate 18, enter the apertures 22 in the die plate 17. Obviously, other forms of working members may be carried by the plunger tube 13 and plunger rod 12, to cause subsequent operations, by reason of the yieldable locking means.

In the form of yieldable locking means shown in Figs. 3 to 7 inclusive, a yieldable locking member having a rotative movement, is carried by the tubular member 12, and engages a shoulder portion of the rod 13, to resist movement of the two members, until a certain pressure is exerted, whereupon the locking member will yield and retreat from the shouldered portion, permitting the movement of the members relatively. The tube 12 is shown as provided with a socket portion, formed by a branch tube 23 whose opening into the tube 12 is slightly larger than the diameter of a rolling member, shown as comprising a ball 24. The rod 13 is provided with a shouldered portion 25, formed by means of a recess 26 of sufficient size to permit the ball to move therein and engage the shoulder 25, or the edge thereof. The ball is pressed into the recess to engage the shoulder by suitable means; preferably yieldable, and comprising, in the form shown, a plunger 27 pressed against the ball by means of a coil spring 28; whose tension is adjusted by means of a screw plunger 29, engaging the threaded aperture in a cap 30, fast on the end of the tube 23. The amount of entrance of the ball into the socket is limited by some portion forming the bottom wall of the recess 26. In the form shown, the stop portion of the recess in the tube 13, is formed by means of an adjustable screw 31, whose end engages the ball. This screw engages a threaded aperture 32 extending through the rod. The tube 12 may be provided with an opening 33 to permit adjustment of the stop screw 31 by a screw driver or other means.

The movement of the rod 13 in the tube 12 may be limited by means of a screw 34 tapped in the rod 13, and riding in a slot 35 in the tube 12. These parts may be so arranged that the screw is at one end of the slot when the ball is in position for locking engagement, and will therefore arrest the return movement of the rod in the tube, after the rod has been advanced, and is returned by any suitable means.

The return of the rod to its former locking position after being advanced, may be effected by means of a spring 36 located in the tube 12, between one end of the rod 13, and the end of the tube 12. In the form shown, the spring is adjustable by means of a plunger 37 whose threaded stem engages a threaded aperture in the end cap 38 of the tube 12.

The operation of the described locking means is as follows: In the normal position of the plunger rod and plunger tube, indicated in Fig. 4, the ball is pressed into engagement with the stop screw 31 by means of the spring 28. Upon a certain pressure being exerted downward on the tube 12, as by the lever 15 or otherwise, and the motion of the rod 13 being arrested, as by the engagement of the die plates 16 and 17, the shoulder portion 25 at its outer edge will engage the ball and move it upwards until it strikes the upper face of the wall of the tube branch. These two points of engagement, and the direction of the force are indicated by the arrow 39 in Fig. 6. Since the place of engagement of the shoulder 25 with the ball is comparatively close to a diameter passing through the upper point of contact with the ball, the mechanical operation will be somewhat similar to that of a wedge whose sides are very little inclined from the parallel. Therefore the force required to move the ball into the branch member against the force of the coil spring will be comparatively great. But upon such resistance being overcome, the ball will roll on the engaging edge of the shoulder 25 as it retreats into the member. This will have the effect of presenting a fresh surface of the engagement of the ball at each operation, and hence prevent undue wear on the same. When the ball begins to move into its socket, the resistance will decrease, because the direction of application of force changes, as indicated by the arrow in Fig. 7. The tangent of the ball at the point of application of force at the shoulder edge, approaching the vertical, or perpendicular line to the resisting face of the branch tube, will cause the ball to move inward with much less resistance. As the shoulder passes beyond the ball, the latter will simply be pressed against the side of the rod 13 as indicated in Fig. 5, and offer comparatively little resistance to the movement of the rod. When the rod 13 is returned to its former position, as by spring 36 or otherwise, the ball will be pressed into the recess again by the spring 28, and return to its former position automatically.

By adjusting the screw stop member 31, the initial position of the ball can be regulated, and therefore the point of application of the force by the shoulder edge on the ball will be varied. If the stop member is screwed out to cause the ball to enter a less distance into the socket, the tangent line of engagement of the shoulder edge with the ball will make a greater angle with the engaging face of the branch tube with the ball, and therefore less force is necessary to overcome resistance to movement of the ball into branch tube. The amount of resistance of the ball to its unlocking movement can also be varied by adjusting the tension of the spring 28, through the screw plunger 29. By increasing this pressure, obviously a greater amount of force is necessary to cause the ball to retreat and permit advancement of the rod 13.

In the modification shown in Fig. 8, a roller or cylinder 40 is substituted for the ball 24, the other parts being the same. In this construction, the front edge of the shoulder portion or face 25, will engage on a line on the roller, instead of engaging theoretically on a point of the ball. And the upper face of the bore of the branch tube will engage throughout a line on the roller, instead of on a point on a ball.

When the lever 15 of the press is lowered, the die member 16 and 17 will engage to form ribs 41 and 42 in the plate 18, and thereupon the further motion of the rod 13 is arrested. Upon greater force being exerted on the lever 15, the tube 12 being forced downward, will cause the upper portion of the wall of the branch 23 to engage the ball and force it into engagement with the edge of the shoulder 25. This will arrest the further movement downward of the plunger tube 12, and cause a greater force to be exerted between the die members 16 and 17. But upon a sufficient force being exerted, the ball will be caused to retreat into the branch member, and the plunger 12 will be permitted to descend, causing the cutting dies 19 to penetrate the plate 18. Upon release of the handle the spring 36 that has been compressed will expand and return the parts to their former position.

In Figs. 11 and 12 is shown a construction in which the two movable members provided with interlocking means, are relatively movable in a curved path. An arm 50 is pivoted at 51 and provided with a segment 52 having a concentric channel 53. In this channel slides a segment bar 54 that may be held therein from lateral movement by means of shoulder portions 55 on the arm engaging suitable rabbet portions on the bar 54. The segment bar may be operated by a link 56 if desired. In the form shown the arm 50 is provided with a socket portion containing the interlocking member, which is shown as comprising a roller member or ball 57 that is pressed outward by a plunger 58. A coil spring 59 extends between the plunger and an adjusting screw 60, whereby the tension on the ball is adjusted. The segment bar 54 is provided with a recess 61, one or both edges or shoulders of which will engage the ball and force it against the opposite shoulder of the socket, thereby locking the members together until sufficient force is exerted tending to move the segment bar relative to the arm, whereupon the ball will retreat and compress the spring, permitting the said relative movement. The entrance of the ball into the recess 61 is adjustably limited by means of a screw 62 contained in a threaded aperture 63 in the segment bar 54. The operation of the locking member in this construction is substantially the same as that set forth in the other figures described wherein the parts are shown as movable in rectilinear paths. In the construction illustrated in Figs. 13, 14 and 15, the interlocking means is located between a wheel member 70 and a hub member 71, that are concentrically movable relatively. In a socket 72 in the hub member 71 is arranged the interlocking member, shown as a ball 73, that is pressed outward by plunger 74 and spring 75; the tension on the spring being adjusted by a screw member 76 operating in a threaded hole 77 in the sleeve 72. The wheel member 70 is provided with a recess 78, the opposite edges of its side walls engaging the ball to lock the members, until sufficient force is exerted to cause the spring to compress, permitting the ball to retreat into the socket. The entrance of the ball into the recess 78 is adjustably limited by a screw 79 operating in a threaded bore 80 in the wheel member 70. The operation of the locking device in this construction is substantially identical with that described with reference to Figs. 1 to 6 inclusive. But in all of the forms shown, the ball or other interlocking member can engage either of the opposite faces of the socket portion of one member, and thereby lock the members together against movement relatively in opposite directions. Whichever way the members are moved, the side wall of one member will engage the ball and force it against the oppositely located side wall of the other member, and thereby arrest the further movement of the members until sufficient force is exerted to unlock the device and release the members for movement relatively.

Having thus described my invention, I claim:

1. The combination of two members relatively movable, an interlocking member organized to lock the members together and prevent relative movement until the exertion of a certain predetermined force, whereupon such member will shift and permit the relative movement of the members, and two separate adjustable means for varying the amount of said force required to effect said release.

2. The combination of two members relatively movable, an interlocking member organized to lock the members together and prevent relative movement until the exertion of a certain predetermined force, whereupon such means will release and permit the relative movement of the members, and means for adjusting the engagement of the locking member with one of the members to thereby vary the amount of the force necessary to effect the release.

3. The combination of two members relatively movable, an interlocking member organized to lock the members together and prevent relative movement until the exertion of a certain predetermined force, whereupon such means will release and permit the relative movement of the members, means for adjusting the engagement of the locking member with one of the members to thereby vary the amount of the force necessary to effect the release, and resilient means for retaining the locking member in locking position.

4. The combination of two members relatively movable, an interlocking member organized to lock the members together and prevent relative movement until the exertion of a certain predetermined force, whereupon such means will release and permit the relative movement of the members, means for adjusting the engagement of the locking member with one of the members to thereby vary the amount of the force necessary to effect the release, resilient means for retaining the locking member in locking position, and means for adjusting the tension of the resilient member.

5. The combination of two members having a relative sliding movement, and an interlocking member organized to lock the members together and prevent relative movement until the exertion of a predetermined force, whereupon such member will shift and permit the relative sliding movement of the members, one of said members being provided with a shoulder, an adjustable stop portion carried by one of said members for varying the amount of engagement of the locking member by the shouldered portion.

6. The combination of two members having a relative sliding movement, and an interlocking member organized to lock the members together and prevent relative movement until the exertion of a certain predetermined force, whereupon such member will shift and permit the relative sliding movement of the members, one member being provided with a shoulder, a stop member on one of the members for limiting the amount of engagement of the locking member by the shoulder portion, the stop member being provided with adjustment means to vary the amount of engagement of the locking member with the shoulder.

7. The combination of two members having a relative sliding movement, and in interlocking member organized to lock the members together and prevent relative movement until the exertion of a certain predetermined force, whereupon such member will shift and permit the relative sliding movement of the members, one member being provided with a shoulder, a stop member on one of the members for limiting the amount of engagement of the locking member by the shoulder portion, the stop member being provided with adjustment means to vary the amount of engagement of the locking member with the shoulder, and yieldable means for pressing the locking member into engagement with the shoulder and stop member.

8. The combination of two members having a relative sliding movement, and an interlocking member organized to lock the members together and prevent relative movement until the exertion of a certain predetermined force, whereupon such member will shift and permit the relative movement of the members, one member being provided with a shoulder, a stop member on one of the members for limiting the amount of engagement of the locking member by the shoulder portion, the stop member being provided with adjustment means to vary the amount of engagement of the locking member with the shoulder, a spring arranged to press the locking member against the stop member, and means for adjusting the tension of the spring.

9. The combination of a member provided with a socket, a member movable relative to said member and provided with a shouldered portion extending perpendicular to the line of movement of said members, and a locking member carried by and movable in said socket portion and arranged to engage the other member at its shouldered portion and thereby be pressed against the relatively opposite wall of the socket portion to resist movement of the members in one direction, the locking member being arranged to retreat into the socket upon the exertion of a certain predetermined force upon the members to release the members and permit relative movement thereof.

10. The combination of a member provided with a socket, a member movable relative to said member and provided with a shouldered portion extending perpendicular to the line of movement of said members, and a locking member carried by and movable in said socket portion and arranged to engage the other member at its shouldered portion and thereby be pressed against the relatively opposite wall of the socket portion to resist movement of the members in one direction, the locking member being arranged to retreat into the socket upon the exertion of a certain predetermined force upon the members to release the members and permit relative movement thereof, and a stop portion carried by the shouldered member for limiting the amount of engagement of the locking member by the shouldered portion of the other member.

11. The combination of a member provided with a socket, a member movable relative to said member and provided with a shouldered portion perpendicular to the line of movement, a locking member carried by the socket member and arranged to engage the other member at its shouldered portion to thereby prevent relative movement of the members in one direction, the locking member being arranged to retreat into the socket upon the exertion of a certain predetermined force upon the members to release the members and permit relative movement, a stop member on the shouldered member for limiting the amount of engagement of the locking member by the shoulder portion, the stop member being adjustable to vary the amount of engagement of the locking member with the shoulder.

12. The combination of a member provided with a socket, a member movable relative to said member provided with a shoulder portion, a locking member carried by the socket member and arranged to engage the other member at its shouldered portion to thereby resist relative movement of the members in one direction, the locking member being arranged to retreat into the socket upon the exertion of a certain predetermined force upon the members to release the members and permit relative movement, a stop portion carried by the shoulder member for limiting the amount of engagement of the locking member by the shoulder portion, and yieldable means for pressing the locking member into engagement with the shoulder and stop member.

13. The combination of a member provided with a socket, a member movable relative to said member and provided with a shoulder portion, a locking member carried by the socket member and arranged to engage the other member at its shouldered portion to thereby resist relative movement of the members in one direction, the locking member being arranged to retreat into the socket upon the exertion of a certain predetermined force upon the members to release the members and permit relative movement thereof, a stop portion carried by the shoulder member for limiting the amount of engagement of the locking member by the shoulder portion, a spring arranged to press the locking member against the stop member, and means for adjusting the tension of the spring.

14. The combination of a member provided with a socket, a member movable relative to said member and provided with a shoulder portion, a rolling member carried by the socket member and arranged to engage the member at its shouldered portion to thereby resist relative movement of the members in one direction, the rolling member being arranged to roll into the socket upon the exertion of a certain predetermined force upon the members to release the members and permit relative movement thereof, and a stop portion carried by the shoulder member for varying the position of engagement of the rolling member by the shoulder portion.

15. The combination of a member provided with a socket, a member movable relative to said member and provided with a shoulder portion, a rolling member carried by the socket member and arranged to engage the other member at its shouldered portion to thereby prevent relative movement of the members in one direction, the locking member being arranged to roll into the socket upon the exertion of a certain predetermined force upon the member to release the member and permit relative movement, a stop member on the shoulder member for engagement with the rolling member, the stop member being adjustable to vary the position of engagement of the locking member with the shoulder.

16. The combination of a member provided with a socket, a member movable relative to said member and provided with a shoulder portion, a rolling member carried by the socket member and arranged to engage the other member at its shoulder portion to thereby resist relative movement of the members in one direction, the locking member being arranged to roll into the socket member upon the exertion of a certain predetermined force upon the member to release the members and permit relative movement, a stop portion carried by the shoulder member for engagement with the rolling member, and yieldable means for pressing the rolling member into engagement with the shoulder and stop member.

17. The combination of a member provided with a socket, a member movable relative to said member, and provided with a shoulder portion, a rolling member carried by the socket member and arranged to engage the other member at its shoulder portion to thereby resist relative movement of the members in one direction, the rolling member being arranged to roll into the socket member upon the exertion of a certain predetermined force upon the members to release the members and permit relative movement, a stop portion carried by the shoulder member for engagement with the rolling member, a spring arranged to press the rolling member against the stop member, and means for adjusting the tension of the spring.

18. The combination of a member provided with a socket, a member movable relative to said member and provided with a recessed portion having a fixed shoulder extending substantially perpendicular to the line of movement of the members, and a rotatable member carried by the socket member and arranged to enter the recess and directly engage the shoulder portion to thereby prevent relative movement of the members until the exertion of a predetermined force whereupon the rotatable member will turn and permit further movement of the members.

19. The combination of a member provided with a socket, a member movable relative to said member and provided with a recessed portion having a fixed shoulder perpendicular to the line of motion, a ball member carried by the socket member and arranged to partly enter the recessed portion to directly engage said shoulder portion to thereby prevent relative movement of the members until the exertion of a predetermined force, whereupon the ball member will turn and permit relative movement of the members.

20. The combination of a member provided with a socket, a member movable relative to said member and provided with a recessed portion having a fixed shoulder perpendicular to the line of motion, a ball member carried by the socket member and arranged to partly enter the recessed portion to directly engage said shoulder portion to thereby prevent relative movement of the members until the exertion of a predetermined force, whereupon the ball member will turn and permit relative movement of the members, and an adjustable stop arranged to vary the position of engagement of the ball with the shoulder portion.

21. The combination of a member provided with a socket, a member movable relative to said member and provided with a recessed portion having a fixed shoulder perpendicular to the line of motion, a ball member carried by the socket member and arranged to partly enter the recessed portion to directly engage said shoulder portion to thereby prevent relative movement of the members until the exertion of a predetermined force, whereupon the ball member will turn and permit relative movement of the members, an adjustable stop arranged to vary the position of engagement of the ball with the shoulder portion, and adjustable means for pressing the ball against said shoulder by a variable amount of force.

22. The combination of two members relatively movable, an interlocking member organized to lock the members together and prevent relative movement until the exertion of a certain predetermined force, whereupon such member will release and permit the relative movement of the members, means for adjusting the engagement of the locking member with one of the members to thereby vary the amount of the force necessary to effect the release, and means for normally resisting the said relative movement of the two members.

23. The combination of two members relatively movable, an interlocking member organized to lock the members together and prevent relative movement until the exertion of a certain predetermined force, whereupon such member will release and permit the relative movement of the members, means for adjusting the engagement of the locking member with one of the members to thereby vary the amount of the force necessary to effect the release, and means for normally resisting the said relative movement of the two members, said means being adjustable to vary such resistance.

Singed at Nos. 9 to 15 Murray street, New York, N. Y., this 12th day of June, 1906.

WILLIAM R. COMINGS.

Witnesses:
WILLIAM H. REID,
FRANCIS E. BOYCE.